(12) United States Patent
Musatenko et al.

(10) Patent No.: US 9,344,639 B2
(45) Date of Patent: May 17, 2016

(54) HIGH DYNAMIC RANGE ARRAY CAMERA

(71) Applicant: Google Technology Holdings LLC, Mountain View, CA (US)

(72) Inventors: Yuriy Musatenko, Mountain View, CA (US); Adrian M Proca, Santa Cruz, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 32 days.

(21) Appl. No.: 14/457,374

(22) Filed: Aug. 12, 2014

(65) Prior Publication Data

US 2016/0050354 A1    Feb. 18, 2016

(51) Int. Cl.
*H04N 5/235* (2006.01)
*G06T 5/50* (2006.01)
*G06T 3/40* (2006.01)

(52) U.S. Cl.
CPC ............ *H04N 5/2355* (2013.01); *G06T 3/4015* (2013.01); *G06T 5/50* (2013.01); *G06T 2207/10004* (2013.01); *G06T 2207/10024* (2013.01); *G06T 2207/10144* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 8,803,985 B2* | 8/2014 | Kaizu | H04N 5/2355 348/208.4 |
| 9,143,749 B2* | 9/2015 | Wernersson | H04N 5/2251 |
| 2009/0086074 A1* | 4/2009 | Li | H04N 5/23245 348/308 |
| 2010/0309333 A1 | 12/2010 | Smith et al. | |
| 2011/0069189 A1 | 3/2011 | Venkataraman et al. | |
| 2012/0105584 A1* | 5/2012 | Gallagher | H04N 9/045 348/46 |
| 2013/0016251 A1* | 1/2013 | Ogasahara | H04N 9/09 348/238 |
| 2014/0063300 A1* | 3/2014 | Lin | H04N 9/045 348/277 |

* cited by examiner

*Primary Examiner* — Albert Cutler

(57) ABSTRACT

In embodiments, a camera device includes HDR monochromatic image sensors that capture an image as an HDR clear image in monochrome, and the camera device includes HDR color image sensors that capture the image as a Bayer image. The HDR monochromatic image sensors may be implemented as interlaced pixel lines having alternating higher exposure times and lower exposure times, or may be implemented as a checkerboard pixel pattern with white pixels of the checkerboard pixel pattern having an exposure duration and black pixels of the checkerboard pixel pattern having a different exposure duration. The camera device implements image processing algorithms that demosaic the Bayer image to generate an initial color image, and demosaic the HDR clear image to generate a clear image. An image fusion application then produces an enhanced, high-resolution HDR color image based on the initial color image and the clear image.

20 Claims, 6 Drawing Sheets

HIGH DYNAMIC RANGE ARRAY CAMERA

BACKGROUND

Portable electronic devices, such as mobile phones, tablet computers, multimedia devices, and the like often include multimedia capabilities that enable a user to capture images (e.g., digital photos), record video, and/or communicate using communication features of a device. To implement these multimedia capabilities, the portable devices are implemented with a camera device that can be used to capture the images, which are then processed and saved as digital photos. Often, the quality of the captured and saved digital photos is dependent on the image processing features of the camera device, and users typically want the highest-resolution quality images for viewing and sharing.

Some camera devices that are implemented as a digital camera or as a component of a portable device, such as a mobile phone, are designed for high dynamic range (HDR) imaging to capture digital photos having a greater dynamic range. This can be accomplished by capturing different exposures of the same subject matter at different exposure levels, and then combining the different exposures to generate a digital photo. Generally, an HDR camera device can be implemented with a monochromatic sensor to capture a clear image in monochrome, and implemented with a Bayer sensor that is a color filter array having an interlaced HDR pattern to capture red, green, or blue color for individual pixels in a Bayer image. The clear image and the Bayer image can then be combined to generate an HDR digital photo of higher quality.

BRIEF DESCRIPTION OF THE DRAWINGS

Embodiments of a high dynamic range array camera are described with reference to the following Figures. The same numbers may be used throughout to reference like features and components that are shown in the Figures.

DETAILED DESCRIPTION

Figure 1:
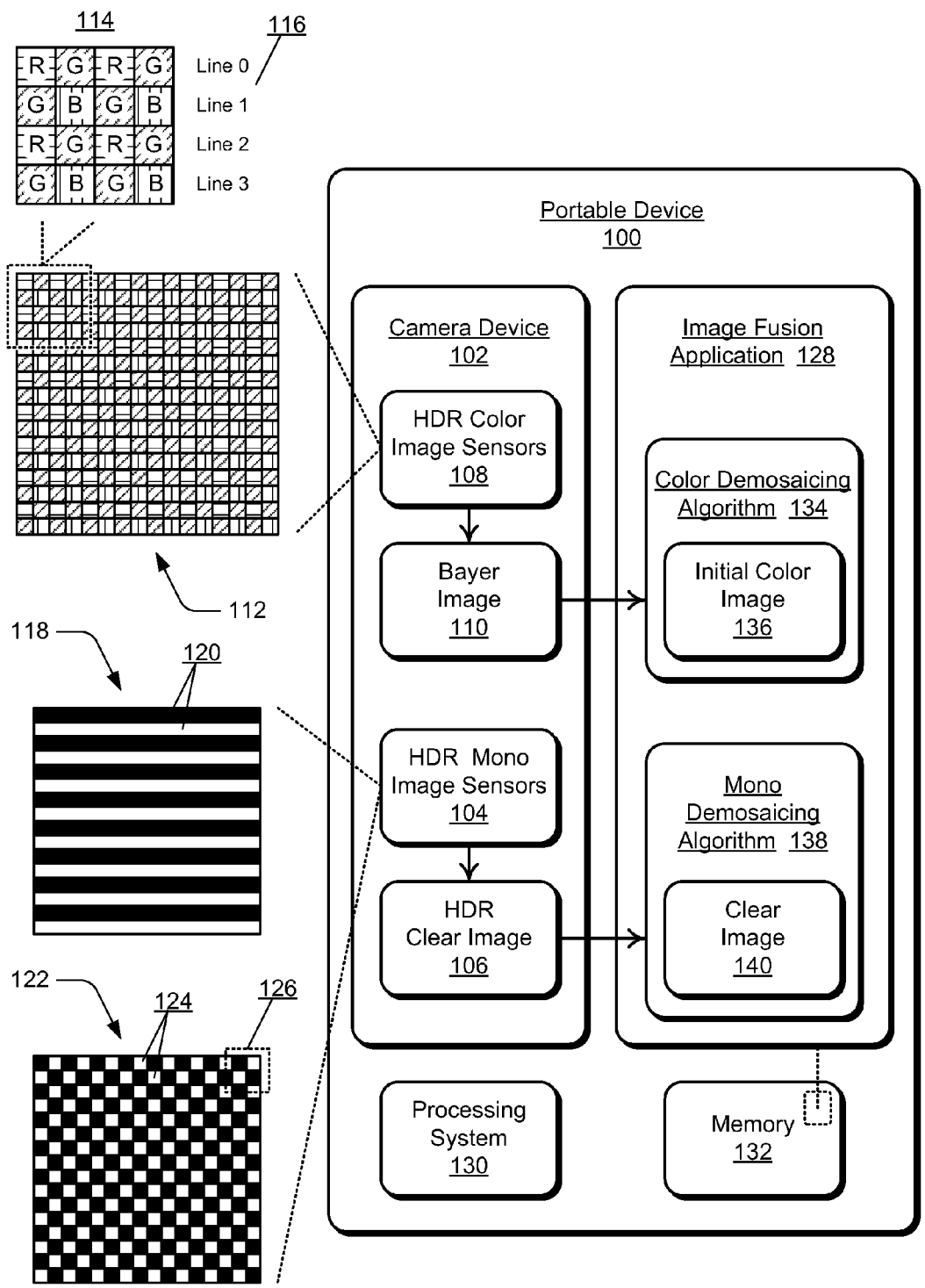
FIG. 1 illustrates an example portable device in which embodiments of a high dynamic range array camera can be implemented.

Embodiments of a high dynamic range (HDR) array camera are described, such as for a camera device that includes HDR monochromatic image sensors that capture the light of an image as an HDR clear image in monochrome, and includes HDR color image sensors that capture the light of the image as a Bayer image. For example, a camera device that is implemented as a digital camera or as a component of a portable device, such as a mobile phone, can be designed for high dynamic range (HDR) imaging to capture digital photos with both HDR monochromatic image sensors and HDR color image sensors. The camera device also implements image processing algorithms of an image fusion application to produce an enhanced, high-resolution HDR color image that has a high signal-to-noise ratio (SNR) based on a clear image that is generated from the HDR clear image. The image enhancements to generate the enhanced, high-resolution HDR color image are achieved with reduced computational complexity over conventional techniques.

In the described techniques, a Bayer-Clear HDR array camera can be implemented with an HDR monochromatic image sensor that has interlaced pixel lines, with odd numbered lines having a higher exposure time and even numbered lines having a lower exposure time (or vice-versa). The Bayer-Clear HDR array camera can also be implemented with an HDR monochromatic image sensor that has a checkerboard pixel pattern, with the white pixels of the pattern having a higher exposure time and the black pixels of the pattern having a lower exposure time (or vice-versa). In other implementations, a single black, white; white, black quadrant of the checkerboard pixel pattern may be implemented with all four of the pixels having different exposure durations to further increase the dynamic range of the HDR mono image sensor. Correspondingly, a Bayer color filter array may be implemented with various complex HDR exposure patterns, some known in the art and that may be similar to or different than an HDR mono image sensor pattern. Typically, Bayer HDR exposure patterns suffer a resolution loss when implemented for HDR capability.

In embodiments of a Bayer-Clear HDR array camera, an HDR clear image and a Bayer image are first interpolated independently, converting sensor pattern pixels into an HDR image, and then the images are processed and fused to generate an enhanced, high-resolution HDR color image. Additionally, a recombination process to generate the enhanced, high-resolution HDR color image will have a resolution as determined from the HDR mono image sensors, which is going to be much higher than the resolution of the Bayer sensor (both in HDR mode). In operation modes of a Bayer-Clear HDR array camera, the HDR mono image sensors and the Bayer, HDR color image sensors can operate in a non-HDR mode and/or in an HDR mode. The camera device can be implemented to utilize the non-HDR mode or the HDR mode depending on scene dynamics, such as based on preliminary photo imaging performed during a capture preview. In the non-HDR mode, all of the pixels of the HDR mono image sensors and the pixels of the HDR color image sensors have the same exposure duration. The camera device may also operate in hybrid modes, having HDR clear on in HDR mode and Bayer in non-HDR mode (or vice-versa).

An image fusion application is implemented by the Bayer-Clear HDR array camera, and includes image processing algorithms that implement techniques for image fusion. A color demosaicing algorithm of the image fusion application is implemented to demosaic the Bayer image and generate an initial color image. Similarly, a mono demosaicing algorithm of the image fusion application is implemented to interpolate an HDR clear image and generate a clear image that restores the high dynamic range and high resolution of the clear image. A dynamic shifts algorithm (also referred to as stereo correspondence) then generates a disparity map to establish correspondence between color image pixels of the initial color image and clear image pixels of the clear image. A mapping algorithm generates a mapped color image based on the disparity map to map the initial color image onto the clear image. A denoising algorithm of the image fusion application generates a denoised clear image from the clear image, and the denoised clear image is applied as a guide image of a guided filter that filters the mapped color image to generate a filtered color image.

A fusion algorithm of the image fusion application then fuses the filtered color image and the denoised clear image to produce the enhanced, high-resolution HDR color image. The fusion is a recombination of a reference channel (e.g., the clear image, also referred to as the clear channel) with non-reference channels (e.g., the initial color image) using the mapped color image. The image fusion application can then reiterate to update the disparity map and the mapped color image based on the enhanced, high-resolution HDR color image to map the enhanced, high-resolution HDR color image onto the clear image. The image fusion application reiterates to update the disparity map and improve the color sampling over that of the initial color image. As a result, the image fusion application utilizes the clear image to debayer the Bayer image based on the reiterated use of the enhanced, high-resolution HDR color image to generate the disparity map and the mapped color image. Multiple Bayer sensors can be used for a more precise calculation of a mapped color image, thus increasing SNR and quality of the image. Multiple monochromatic image sensors can also be used for a more precise mapping calculation, thus providing a better quality mapped image. The enhanced, high-resolution HDR color image also has a high SNR derived from the denoised clear image.

While features and concepts of a high dynamic range array camera can be implemented in any number of different devices, systems, and/or configurations, embodiments of a high dynamic range array camera are described in the context of the following example devices, systems, and methods.

FIG. 1 illustrates an example portable device 100 in which embodiments of a high dynamic range array camera can be implemented. The portable device 100 may be any type of portable electronic and/or computing device, such as a mobile phone, tablet computer, communication, entertainment, handheld navigation, portable gaming, media playback, and/or any other type of electronic and/or computing device. The portable device 100 includes a camera device 102, such as an array camera that performs computations to implement the fusion of image sensors. The high dynamic range (HDR) array camera is designed for HDR imaging and includes at least one monochromatic (clear) channel and at least one Bayer (color) channel providing color output. In implementations, the portable device 100 may be implemented as the camera device itself.

In this example, the camera device 102 is implemented with one or more HDR monochromatic image sensors 104 that capture the light of an image as an HDR clear image 106 in monochrome. The camera device 102 also includes one or more HDR color image sensors 108 that capture the light of the image as a Bayer image 110 in red, green, and blue (RGB) color with a Bayer color filter array. Each pixel of the Bayer image 110 is only one of red, green, or blue as captured by the Bayer pattern of the color filter array. An example Bayer color filter array 112 includes an interlaced HDR pattern 114 having alternating lines 116 of alternating red and green pixels (e.g., lines 0, 2, etc.), and alternating green and blue pixels (e.g., lines 1, 3, etc.). All of the additional lines of the Bayer color filter array 112 would be configured similar in a periodic manner. If a given array line number is denoted as N and if N/2=0, then the array line has a high exposure, and if N/2=1, then the array line has a lower exposure. In implementations, the exposure may be different even within a single RGGB block, which increases the complexity of the exposure pattern.

To extend the limited dynamic range of a Bayer color filter array 112, the alternating different lines and/or some pixels can be assigned shorter exposure times, while other lines or pixels have longer exposure times, which achieves a greater dynamic range. However, increasing the dynamic range with the different assigned exposures results in a loss of resolution and sharpness. In an HDR mode of the camera device 102, the array lines 0 and 1 can have 2×, 4×, 8×, or more times higher exposure than the array lines 2 and 3. Generally, HDR Bayer sensors have a lower resolution (approximately 2× lower) than conventional Bayer sensors, and resolution can be particularly low for the red and blue channels in an HDR mode.

In embodiments, an example of the HDR monochromatic image sensor 104 of the camera device 102 is the HDR monochromatic image sensor 118 that has interlaced pixel lines 120, with the odd numbered lines having a higher exposure time and the even numbered lines having a lower exposure time (or vice-versa). In implementations, the odd numbered pixel lines and the even numbered pixel lines have different exposure durations. Another example is the HDR monochromatic image sensor 122 that has a checkerboard pixel pattern 124, with the white pixels of the pattern having a higher exposure time and the black pixels of the pattern having a lower exposure time (or vice-versa). In implementations, the black and white pixels of the checkerboard pixel pattern 124 have different exposure durations. In other implementations, a single black, white; white, black quadrant 126 may be implemented with all four of the pixels having different exposure durations to further increase the dynamic range of the HDR monochromatic image sensor 122. Correspondingly, the Bayer color filter array 112 may be implemented with the more complex exposure pattern to coincide with the HDR mono image sensor.

Either of the example HDR monochromatic image sensors 118 and 122 can be implemented with the Bayer color image sensors 108 in a computational, Bayer-Clear HDR array camera. Given that the Bayer color image sensors 108 and the HDR mono image sensors 104 have the same resolution, size, and lens, an HDR mono image sensor will provide a much higher spatial resolution than a Bayer sensor because the HDR mono image sensor has just the two types of pixels (e.g., with the high and low exposures), as compared to the Bayer sensor that has six types of pixels (e.g., RGB and each having the low and high exposures).

In embodiments of a Bayer-Clear HDR array camera, the HDR clear image 106 and the Bayer image 110 are first interpolated independently, and then image processed to generate an enhanced, high-resolution HDR color image. This is described with reference to an image fusion application 128 that is implemented by the portable device 100, as described below and with reference to FIG. 2. The higher resolution of the interlaced and/or checkerboard HDR mono image sensors 104 will provide for guided filtering of the Bayer image 110 that is mapped to the clear channel with high-quality noise reduction. Additionally, a recombination process to In operation modes of a Bayer-Clear HDR array camera, the HDR monochromatic image sensors 104 and the Bayer color image sensors 108 can operate in a non-HDR mode and/or in an HDR mode. The camera device 102 can be implemented to utilize the non-HDR mode or the HDR mode depending on scene dynamics, such as based on preliminary photo imaging performed during a capture preview. In the non-HDR mode, all of the pixels of the HDR mono image sensors 104 and the pixels of the HDR color image sensors 108 have the same exposure duration. The camera device 102 may also operate in hybrid modes, having HDR clear on in HDR mode and Bayer in non-HDR mode (or vice-versa).

The example portable device 100 can include a wired and/or battery power source to power device components, such as a processing system 130. The portable device 100 can also include memory 132, as well as any number and combination of components as further described with reference to the example device shown in FIG. 6. The portable device 100 includes the image fusion application 128 that can be implemented as a software application or module (e.g., executable instructions) stored on computer-readable storage memory, such as any suitable memory device or electronic data storage (e.g., the memory 132). The portable device 100 can be implemented with computer-readable storage memory as described with reference to the example device shown in FIG. 6. In implementations, the image fusion application 128 includes image processing algorithms that implement the techniques for image fusion described herein.

The image fusion application 128 includes a color demosaicing algorithm 134 to demosaic the Bayer image 110 and generate an initial color image 136. The pixels of the initial color image 136 are generated to have all of the RGB colors from the pixels of the Bayer image 110 that are each only one of the red, green, or blue color. As shown in the example, the color demosaicing algorithm 134 receives an input of the Bayer image 110 and generates an output as the initial color image 136. A traditional demosaicing technique can be implemented to reconstruct a full color image (e.g., the initial color image 136) from incomplete color samples that are output from an image sensor, such as described by Keigo Hirakawa et al. in "Adaptive Homogeneity-Directed Demosaicing Algorithm" (AHID algorithm) (IEEE Transactions on Image Processing Vol: 14, Issue:3, March 2005). The color demosaicing algorithm 134 may also be implemented for adaptive homogenous interpolation demosaicing (AHID) or extensions thereof for HDR modes, or may utilize a linear interpolation technique.

The image fusion application 128 also includes a mono demosaicing algorithm 138 to demosaic the HDR clear image 106 (e.g., or other implemented interpolation) and generate a clear image 140 to restore the high dynamic range and high resolution of the clear image. Features and techniques of the image fusion application 128 as implemented by the portable device 100 are further described with reference to FIG. 2.

Figure 2:
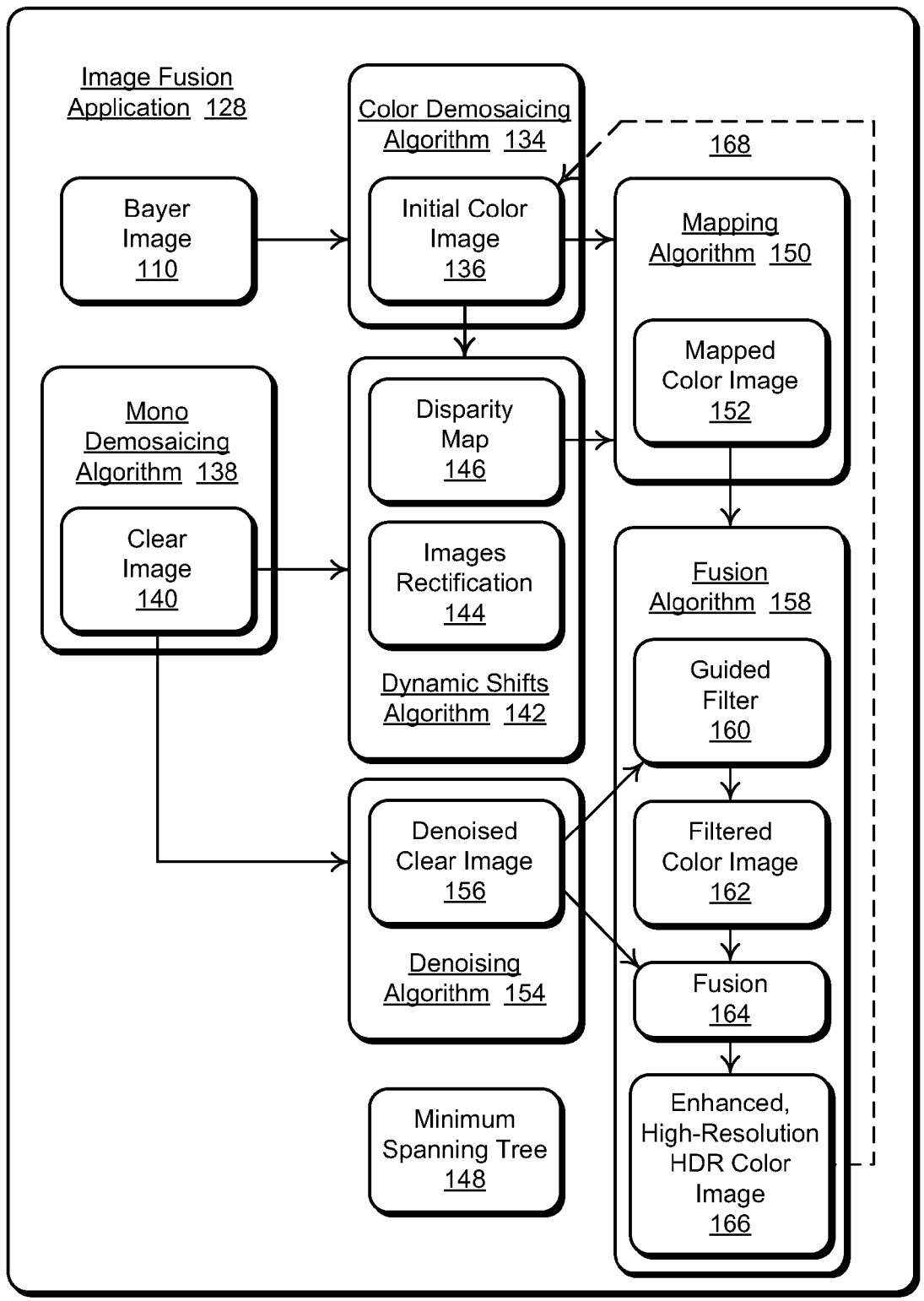
FIG. 2 further illustrates an image fusion application of the example portable device shown in FIG. 1 that implements techniques for a high dynamic range array camera.

FIG. 2 further illustrates the image fusion application 128 that is implemented by the portable device 100, as described with reference to FIG. 1, to implement techniques for a high dynamic range array camera. The image fusion application 128 includes a dynamic shifts algorithm 140 that is implemented for images rectification 144 and to generate a disparity map 146. The images rectification 144 can be based on a model of the camera lens that is used to capture the images, and is implemented for pixel correction to undistort the clear image 140 and the initial color image 136. The dynamic shifts algorithm 140 generates the disparity map 146, which establishes correspondence between color image pixels of the initial color image and clear image pixels of the clear image. As shown in the example, the dynamic shifts algorithm 140 receives inputs of the clear image 140 and the initial color image 136, and then generates an output as the disparity map 146.

The dynamic shifts algorithm 140 can also generate a minimum spanning tree (MST) 148 or pixels, which can be extended to a segmentation tree, where an image is first segmented and then the minimum spanning tree is built within every segment. The minimum spanning tree can be created for any particular image, and every node corresponds to the image pixels and every edge represents the difference between pixels intensity or RGB values (or some other metric). The MST is useful for fast calculations of distance between pixels in a sense of difference of their intensities. Minimum spanning tree models are created for the clear image 140 and the initial color image 136, where nodes of the MST represent the pixels of the clear image and the color image. In the minimum spanning tree 148, every node represents the color intensity of a pixel or a set of pixels, and the edges between nodes represent the difference between node intensities. A clear image pixel node of the MST contains an intensity of the pixel, whereas a color image pixel node contains the color of the pixel with the three R, G, and B components. In implementations, the minimum spanning tree 148 can be created using different techniques. Use of a minimum spanning tree for stereo correspondence matching is a known technique as described by Q. Yang, A Non-Local Cost Aggregation Method for Stereo Matching" (IEEE Conference on Computer Vision and Pattern Recognition (CVPR) 2012, 1402-1409).

The dynamic shifts algorithm 140 can then calculate the disparity map 146 based on the minimum spanning tree 148 that maps color image pixels of the initial color image 136 to clear image pixels of the clear image 140. An example of an algorithm to generate a disparity map is described by Q. Yang, A Non-Local Cost Aggregation Method for Stereo Matching" (IEEE Conference on Computer Vision and Pattern Recognition (CVPR) 2012, 1402-1409). In implementations, the disparity map 146 (also referred to as a depth map) may also be calculated by different techniques, such as using the technique described by Xing Mei et al. in "Segment-Tree based Cost Aggregation for Stereo Matching" (CVPR2013). In implementations, the mapping is calculated using clear channel (e.g., the clear image) and a luma component from the initial color image, calculated using a simple or traditional version of debayer. This calculation can also use segmentation and the minimum spanning tree. Additionally, use of a penalty function can be census, or census in combination with sum of absolute difference.

The image fusion application 128 also includes a mapping algorithm 150 that is implemented to generate a mapped color image 152 based on the disparity map 146 to map the initial color image 136 onto the clear image 140. As shown in the example, the mapping algorithm 150 receives inputs of the initial color image 136 and the disparity map 146, and generates an output as the mapped color image 152. The signal-to-noise ratio (SNR) is higher in the clear image 140, having better sharpness (e.g., better sampling than in the color image), and the disparity map 146 is used to map the initial color image onto the clear image. In implementations, the mapped color image 152 may be mapped as a red, green, blue (RGB) color image from which a filtered color image is generated and used to produce an enhanced, high-resolution HDR color image. Alternatively, the mapped color image 152 may be mapped as a luma and chrominance (YUV) components image from which the filtered color image is generated and used to produce the enhanced, high-resolution HDR color image.

The image fusion application 128 includes a denoising algorithm 154 that is implemented to denoise the clear image 140 and generate a denoised clear image 156. As shown in the example, the denoising algorithm 154 receives an input of the clear image 140 and then generates an output as the denoised clear image 156. The image fusion application 128 also includes a fusion algorithm 158 that is implemented to apply the denoised clear image 156 as a guide image of a guided filter 160 that filters the mapped color image 152 to generate a filtered color image 162. As shown in the example, the fusion algorithm 158 receives inputs of the mapped color image 152 and the denoised clear image 156, and then generates an output as the filtered color image 162 utilizing the guided filter 160. The denoised clear image 156 is used as the guide image to construct the guided filter 160, which can then be applied to the RGB color space, or the YUV space of the mapped color image 152, to generate the filtered color image 162. Guided filter is a technique that allows filtering of one image using kernels built from information of another image, and is described by K. He et al. in "Guided Image Filtering" (European Conference on Computer Vision (ECCV), 2010, pp. 1-14).

The fusion algorithm 158 implements fusion 164 (also referred to as recombination) to combine the filtered color image 162 and the denoised clear image 156 to produce an enhanced, high-resolution HDR color image 166. This technique preserves the high resolution of the clear image 140 (e.g., via the denoised clear image 156 which has a high signal-to-noise ratio) and preserves the color from the initial color image 136 (e.g., via the mapped color image 152). The image fusion application 128 is implemented to then reiterate at 168 in the undistorted image space and produce a higher quality debayered image using the MST based technique and using a clear image MST and Bayer pattern. This then produces the higher quality color image that allows to further (optionally) update the disparity map 146 and the mapped color image 152 based on the enhanced, high-resolution HDR color image 166 to map the enhanced, high-resolution HDR color image onto the clear image. The image fusion application may update the minimum spanning tree 148 that models color sampling of the initial color image 136 to regenerate disparity map 146 and improve the color sampling over the initial color image, if needed. The image fusion application 128 effectively utilizes the clear image 140 to debayer the Bayer image 110 based on the reiterated use of the enhanced, high-resolution HDR color image 166 that updates the disparity map 146 and the mapped color image 152.

The dynamic shifts algorithm 140 can reiterate several passes to improve the color sampling and disparity map 146 output. Initially, the color demosaicing algorithm 134 approximates the initial color image 136 based on the red, green, or blue color value of each pixel in the Bayer image 110. However, given the known minimum spanning tree 148 and the enhanced, high-resolution HDR color image 166, the initial color image 136 can be replaced and then used for mapping to generate the disparity map 146 and the mapped color image 152. Components and features of the image fusion application 128 are further shown and described with reference to FIG. 3.

For nodes of the minimum spanning tree 148 having less than the three RGB colors, neighboring nodes are looked to in the minimum spanning tree, and the colors can be interpolated between the nodes. The image fusion application 128 is implemented to leverage the distance between the nodes of the tree, such as to determine a node having the shortest distance on the tree and that has lacking color. The image fusion application can determine a few of these nodes, and then utilize various techniques to interpolate the color into the pixels that are lacking a given color. One such technique that may be implemented is a linear combination with weights equal to a distance from the node to neighboring nodes with known color.

For example, if the red (R) color pixel is missing in the current node, the image fusion application 128 can traverse up the minimum spanning tree 148 to find a node that has an R pixel present, and also back down the tree to find another node that has the R pixel. The image fusion application can then interpolate the R color in the node that is missing the R color with unknown R by averaging the R color from the up and down neighboring nodes using the distance on the edges as a weight. This approach can be applied for all RGB channels, and to provide the pixel colors for all of the minimum spanning tree nodes in all three of the R, G, and B components. This results in a segmented tree-based Debayer mapped to clear channel, providing an image with known RGB values assigned to every pixel of the clear image.

As described, the image fusion application 128 generates the coloring of the minimum spanning tree nodes and the clear channel pixel values are determined, from which the image fusion application can implement the fusion algorithm 158 to recombine the clear and colors in RGB space or in YUV space. Additionally, if multiple bayer channels are implemented, then more of the color pixels in the same node (coming from different Bayer sensors) can be evaluated, and the values of RGB from the different sensors averaged over the pixels in a node for a more precise color value within the node.

Additionally, averaging the color pixel values over a node can be performed even when a single Bayer array is utilized, which can increase the signal-to-noise ratio (SNR) in larger flat areas or patches of an image. In an implementation, the clear channel and Bayer channel resolution are the same, where the Bayer channel has significantly less resolution than traditional Bayer. The advantage of this algorithm is that, in many cases, it will result in very sharp color output because the color boundaries in most cases can be derived by grouping pixels in the clear channel reflected by the segmentation tree. If the described algorithm does not take into account transitions of colors preserving the same luma, the image fusion application 128 can be implemented to detect the transitions and utilize the output of traditional Debayer in such areas, which can be performed on a traditionally debayered image. The resolution may be somewhat limited by the traditional debayer in such areas, however, occurrences of such boundaries are not very frequent and in areas where luma has edges, the areas will have proper coloring with luma defined resolution.

The image fusion application 128 may also be implemented to perform other operations, such as lens shading, as well as undistortion for every channel prior to a disparities calculation. The disparities calculation utilizes stereo calibration prior, and uses calibration parameters from the calibration stage for the disparities calculation. The pixel mapping that is derived from the disparities calculation can be used in the undistorted or distorted (initial) image, such as to allow for a decrease in noise influence in the distorted image on the quality of the output picture.

Figure 3:
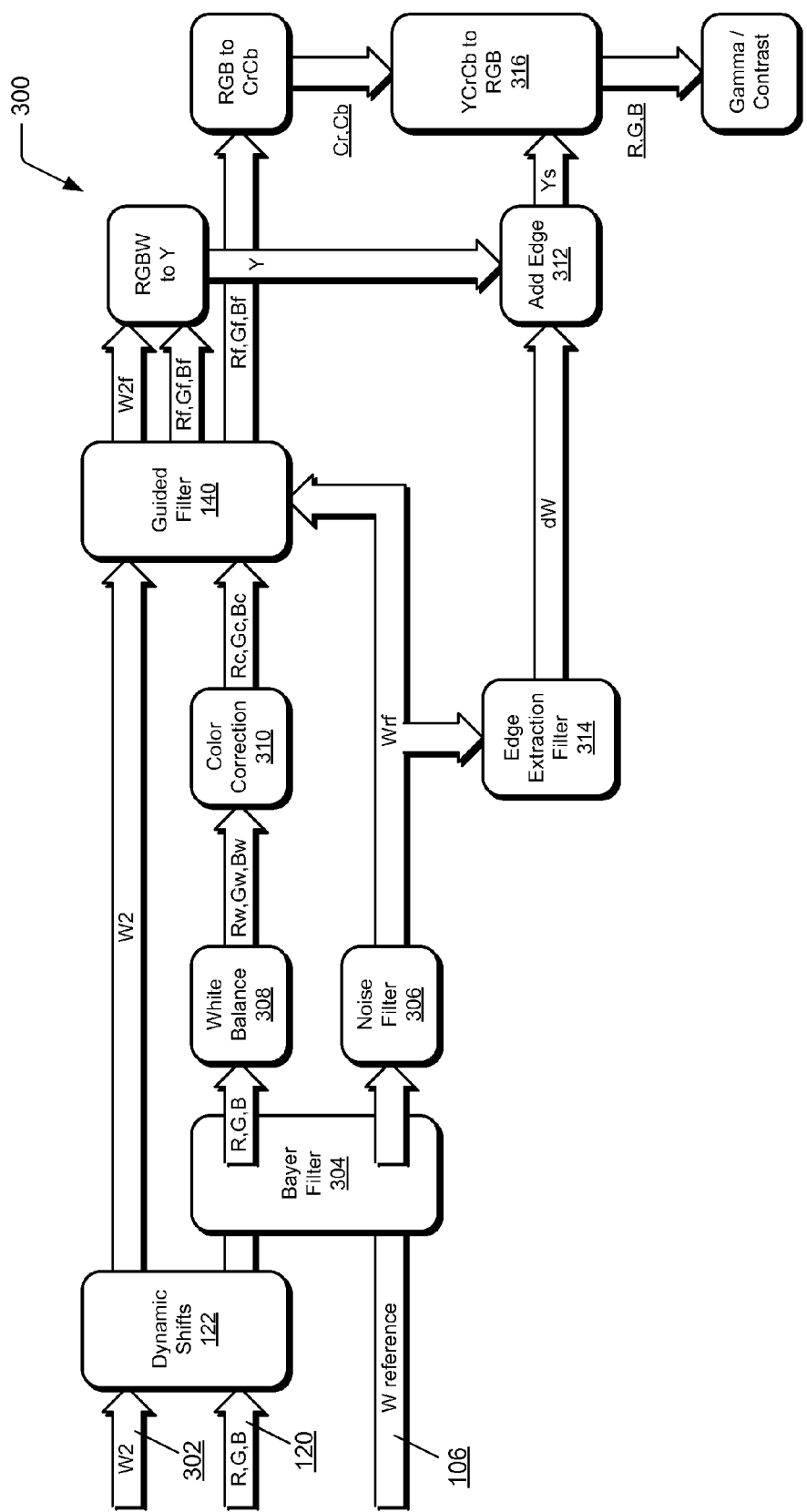
FIG. 3 illustrates an example image fusion application implemented by the portable device in embodiments of a high dynamic range array camera.

FIG. 3 illustrates an example 300 of the image fusion application 128 and the image processing algorithms, as described with reference to FIGS. 1 and 2, and that is implemented to fuse the filtered color image 162 (e.g., Bayer channel image) and the denoised clear image 156 (e.g., clear channel image). The image fusion application 128 receives the clear image 140 as the clear channel identified as the "W reference" (e.g., a white reference channel $W_i$), a luma component 302 identified as "W2" in the example, and the initial color image 136 identified as RGB in the illustrated example 300. The RGB input includes a red channel ($R_i$), a green channel ($G_i$), and a blue channel ($B_i$). Generally, a white channel color recombination processor combines the white channel with the RGB color channels, and the image fusion application 128 then outputs a red channel ($R_o$), a green channel ($G_o$), and a blue channel ($B_o$). In implementations, the color input channels are scaled so that they will match the W reference channel (e.g., the clear channel) in intensity. The scaler can be derived at the calibration stage and stored in the calibration data, and the scaling itself can be performed as a pixel multiplication operation.

The image fusion application 128 implements a joint demosaicing with a Bayer filter 304 after a dynamic shift using the luma component 302 and the RGB from the initial color image 136. The image fusion application 128 is also implemented to extract the color information from RGB utilizing an RGB to YCbCr linear transformation, where:

$$Cb=Kcb\_r*R_i+Kcb\_g*G_i+Kcb\_b*B_i;$$

$$Cr=Kcr\_r*R_i+Kcr\_g*G_i+Kcr\_b*B_i;$$

const float Kcb_r=−0.168736 f;
const float Kcb_g=−0.331264 f;
const float Kcb_b=0.5 f;
const float Kcr_r=0.5 f;
const float Kcr_g=−0.418688 f;
const float Kcr_b=−0.081312 f The luma channel is created by a linear combination of the input color channels $R_i$, $G_i$, and $B_i$ and the input clear channel W reference ($W_i$) to form a new Y channel (Yw), where Yw=(c00*$R_i$+c01*$G_i$+c02*$B_i$+c03*$W_i$). The [c00-c03] coefficients can be derived at the calibration stage and stored in the calibration data. The clear channel (e.g., clear image 140) identified as the "W reference" is input to the noise filter 306 for noise suppression (e.g., an example of the denoising algorithm 154). Other algorithms for noise suppression may also be implemented, such as non-local means (NLM), bilateral filtering, Gaussian filters, and the like. The image fusion application can also be implemented to perform a white balance 308 and a color correction 310 of the initial color image 136 (e.g., the RGB color inputs). The newly created Yw channel data can be enhanced by adding edge information at 312, where Yee=Yw+EEi. An edge extraction filter 314 is implemented to extract edges from the clear channel and boost the edges to define sharpness.

The image fusion application 128 implements the guided filter 160 that combines the luma component 302 identified as the "W2" input, the clear channel (e.g., clear image 140) identified as the "W reference" input, and the RGB color input of the initial color image 136. An implementation of the guided filter 160 is described by Kaiming He et al. in "Guided Image Filtering" (European Conference on Computer Vision (ECCV), 2010, pp. 1-14). The guided filter 160 forms a filtering kernel in every image locality, and a kernel calculation is based on one image as it is applied to another image. A bilateral filter may be implemented as a particular type of the guided filter when both images coincide. A conventional implementation uses an approximation of optimal kernel by several box filters, which allows for a fast implementation. The image fusion application 128 then converts back to the RGB color space at 316 from the Yw and Cr, Cb channels that are processed as described above. This is accomplished with:

$$Ro=Yw+Kr\_cr*Cr;$$

$$Go=Y+Kg\_cb*Cb+Kg\_cr*Cr;$$

$$Bo=Y+Kb\_cb*Cb;$$

const float Kr_cr=1.402 f;
const float Kg_cb=−0.34414 f;
const float Kg_cr=−0.71414 f;
const float Kb_cb=1.772 f In embodiments, the image fusion application 128 can be implemented to perform the recombination in the YUV space, rather than RGB. The recombination algorithm calculates a recombined luma of the clear channel and the Bayer channel from the luma of the clear channel (W) and the UV components of the Bayer channels. The model fuses luma Yw as: Yw=p*U+s*V+q(u, v)*W, where q(u, v)=qw+qu*U+qv*V. This is a second order model with respect to UV that uses a scaled clear channel luma and Bayer UV for a high SNR output luma. For a full-color output, the recombination algorithm utilizes Yw and noise filtered UV components from the Bayer channel. Further, the Yw luma can be improved when using sharpness information EE as mentioned above for RGB recombination.

The image fusion application 128 can also be implement a calibration stage, where measurements for every type of light and measure of the RGB intensities over the patches of MacBeth chart data, and solve them for an over-determined system using LSF. The model parameters qw, qu, qv can be determined so that data points best fit the linear curve (plane), and the overall error is minimized. An error determined for the i-th measurement is Eri=qi(u, v)*Wi+p*Ui+s*Vi Ywi, where qi(u, v)=qw+qu*Ui+qv*Vi. The variables Ui and Vi are UV values determined from the Bayer channel; the Wi are values determined from the clear channel; and the Ywi is determined from the MacBeth chart patches definition.

This is a second order model. However, if qu=qv=0, then the model is of a first order similar to RGB. The Sum(Eri^2) is minimized, which drives the sum error to zero as much as possible. This can be solved by LSF, the same as for the RGB case. A runtime stage can use this equation for recombining Yw=q(u, v)*W+p*U+s*V. An advantage of implementing the recombination in the YUV space is that UV components are typically very low pass, which allows strong noise suppression without loss of useful information. This in particular allows for a decrease of the color noise.

Example method 400 is described with reference to FIG. 4 in accordance with implementations of a high dynamic range array camera. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 4:
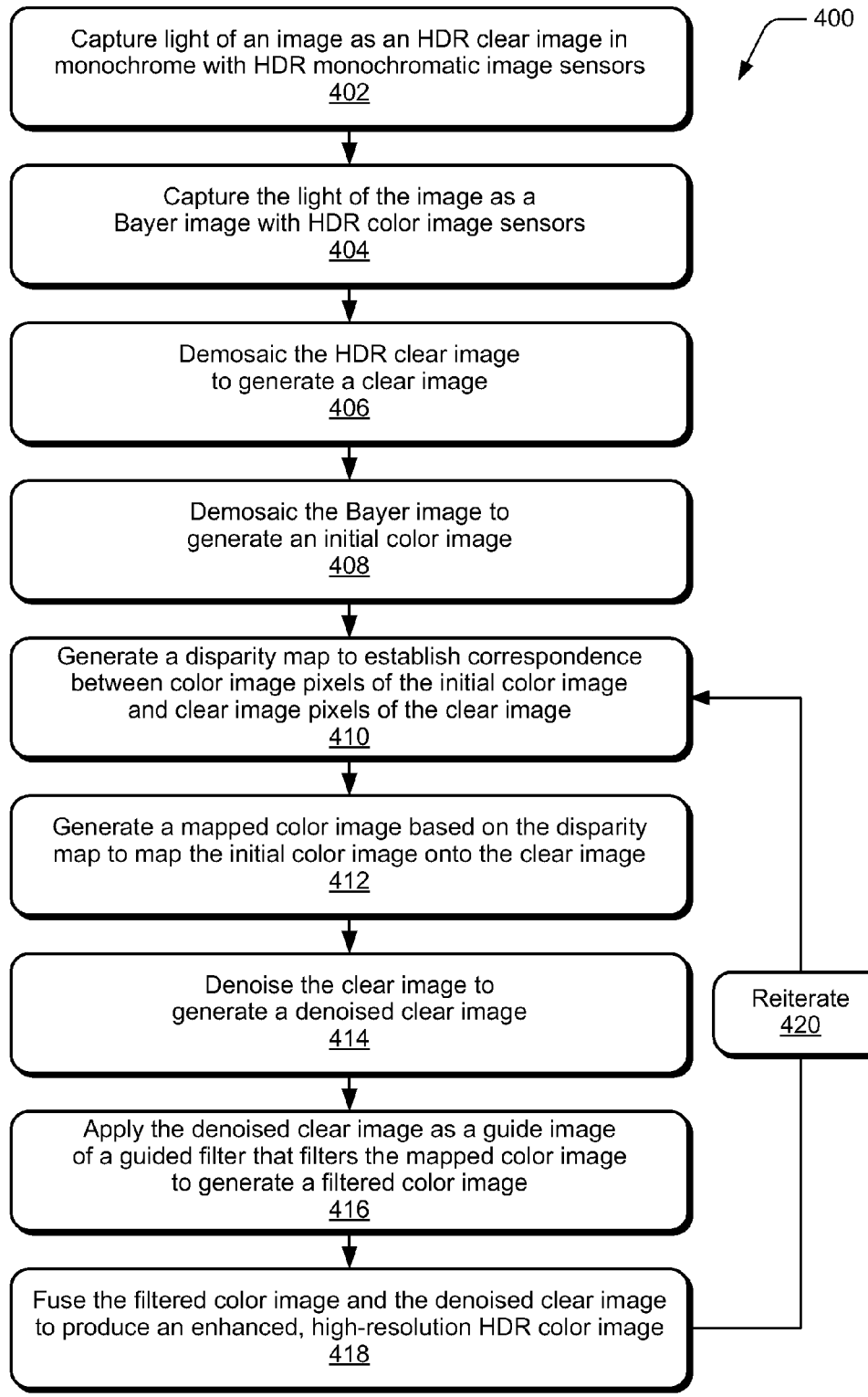
FIG. 4 illustrates an example method of a high dynamic range array camera in accordance with one or more embodiments.

FIG. 4 illustrates example method(s) 400 of a high dynamic range array camera. The order in which the method is described is not intended to be construed as a limitation, and any number or combination of the described method operations can be performed in any order to perform a method, or an alternate method.

At 402, the light of an image is captured as an HDR clear image in monochrome with HDR monochromatic image sensors. For example, the camera device 102 implemented in the portable device 100 (FIG. 1) includes the HDR monochromatic image sensors 104 that capture the light of an image as the HDR clear image 106 in monochrome. In implementations, the HDR monochromatic image sensors 104 have interlaced pixel lines having alternating higher exposure times and lower exposure times, or may be implemented as a checkerboard pixel pattern with white pixels of the checkerboard pixel pattern having an exposure duration and black pixels of the checkerboard pixel pattern having a different exposure duration. At 404, the light of the image is captured as a Bayer image with one or more HDR color image sensors. For example, the camera device 102 includes the HDR color image sensors 108 that capture the light of the image as the Bayer image 110.

At 406, the HDR clear image is demosaiced to generate a clear image. For example, the portable device 100 implements the image fusion application 128 that includes the mono demosaicing algorithm 138, which demosaics the HDR clear image 106 to generate the clear image 140. At 408, the Bayer image is demosaiced to generate an initial color image. For example, the portable device 100 implements the image fusion application 128 that includes the color demosaicing algorithm 134, which demosaics the Bayer image 110 to generate the initial color image 136. The image fusion application 128 independently interpolates the Bayer image 110 and the HDR clear image 106 to said generate the initial color image 136 and the clear image 140.

At 410, a disparity map is generated to establish correspondence between color image pixels of the initial color image and clear image pixels of the clear image. For example, the image fusion application 128 includes the dynamic shifts algorithm 140 that generates the disparity map 146 to establish correspondence between color image pixels of the initial color image 136 and clear image pixels of the clear image 140. The dynamic shifts algorithm 140 also implements the images rectification 144 to rectify the initial color image 136 and the clear image 140 for pixel correction to generate the disparity map.

At 412, a mapped color image is generated based on the disparity map to map the initial color image onto the clear image. For example, the image fusion application 128 includes the mapping algorithm 150 that generates the mapped color image 152 based on the disparity map 146 to map the initial color image 136 onto the clear image 140. In implementations, a pixel correspondence of Bayer color image pixels are mapped to clear channel image pixels to map the color image to the clear image. The mapped color image can be generated as a red, green, blue (RGB) color image from which a filtered color image is generated and used to produce an enhanced, high-resolution HDR color image. Alternatively, the mapped color image can be generated as a luma and chrominance (YUV) components image from which the filtered color image is generated and used to produce the enhanced, high-resolution HDR color image.

At 414, the clear image is denoised to generate a denoised clear image. For example, the image fusion application 128 includes the denoising algorithm 154 that denoises the clear image 140 to generate the denoised clear image 156. At 416, the denoised clear image is applied as a guide image of a guided filter that filters the mapped color image to generate a filtered color image. For example, the image fusion application 128 includes the fusion algorithm 158 that applies the denoised clear image 156 as a guide image of a guided filter 160 that filters the mapped color image 152 to generate the filtered color image 162. The denoised clear image 156 is used as the guide image to construct the guided filter 160, which can then be applied to the RGB color space, or the YUV space of the mapped color image 152, to generate the filtered color image 162.

At 418, the filtered color image and the denoised clear image are fused to produce an enhanced, high-resolution HDR color image. For example, the image fusion application 128 includes the fusion algorithm 158 that implements fusion 164 (also referred to as recombination) to combine the filtered color image 162 and the denoised clear image 156 to produce the enhanced, high-resolution HDR color image 166. The enhanced, high-resolution HDR color image is generated having a high signal-to-noise ratio derived from the denoised clear image. At 420, the image fusion application 128 reiterates to update the disparity map 146 and the mapped color image 152 based on the enhanced, high-resolution HDR color image 166 to map the enhanced, high-resolution HDR color image onto the clear image.

Figure 5:
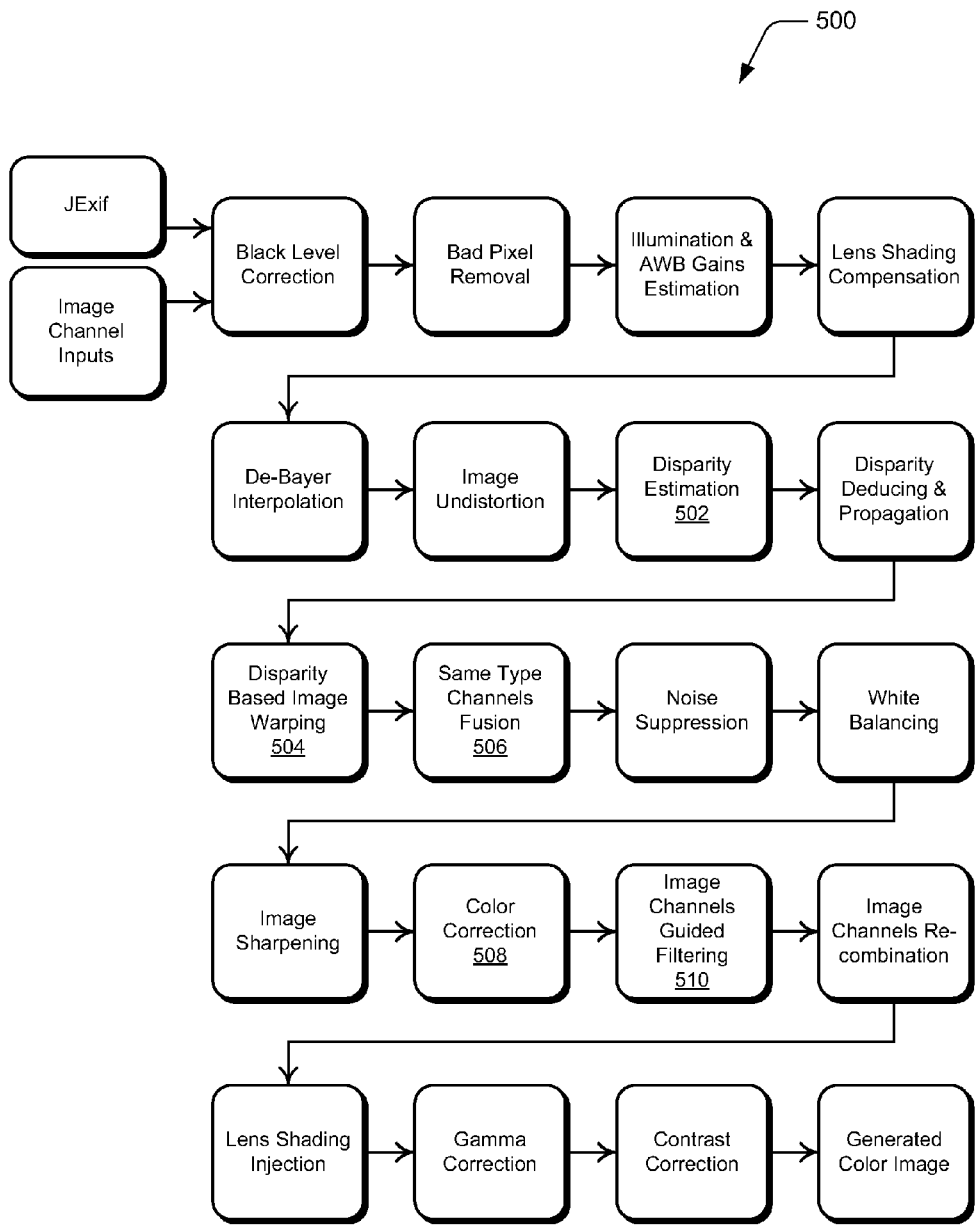
FIG. 5 illustrates an example image processing system of a high dynamic range array camera in accordance with one or more embodiments.

FIG. 5 illustrates an example image processing system 500 of a high dynamic range array camera, as described with reference to FIGS. 1-4. The computational camera generates the enhanced, high-resolution HDR color image 166 having resolution in the Y-component that is much higher than would be available from a traditional Bayer camera, and has resolution in the UV colors, or separately in the RGB colors, which are also higher than would be available from a traditional Bayer camera. The processing system 500 (or "pipeline") implements some conventional features that are known for providing high-quality output images, such as with HDR imaging. Additionally, the disparity estimation 502 correlates with the dynamic shifts algorithm 140 of the image fusion application 128 as shown in FIG. 2. The disparity based image warping 504 is utilized to align one image to another, such as the clear image 140 and the initial color image 136, followed by the same type channels fusion 506 to merge more than two sensors captured images. The color correction 508 followed by the image channels guided filtering 510 can be implemented as a bilateral filter for custom denoising of each pixel (or point) in an image, to generate a quality denoised image.

Figure 6:
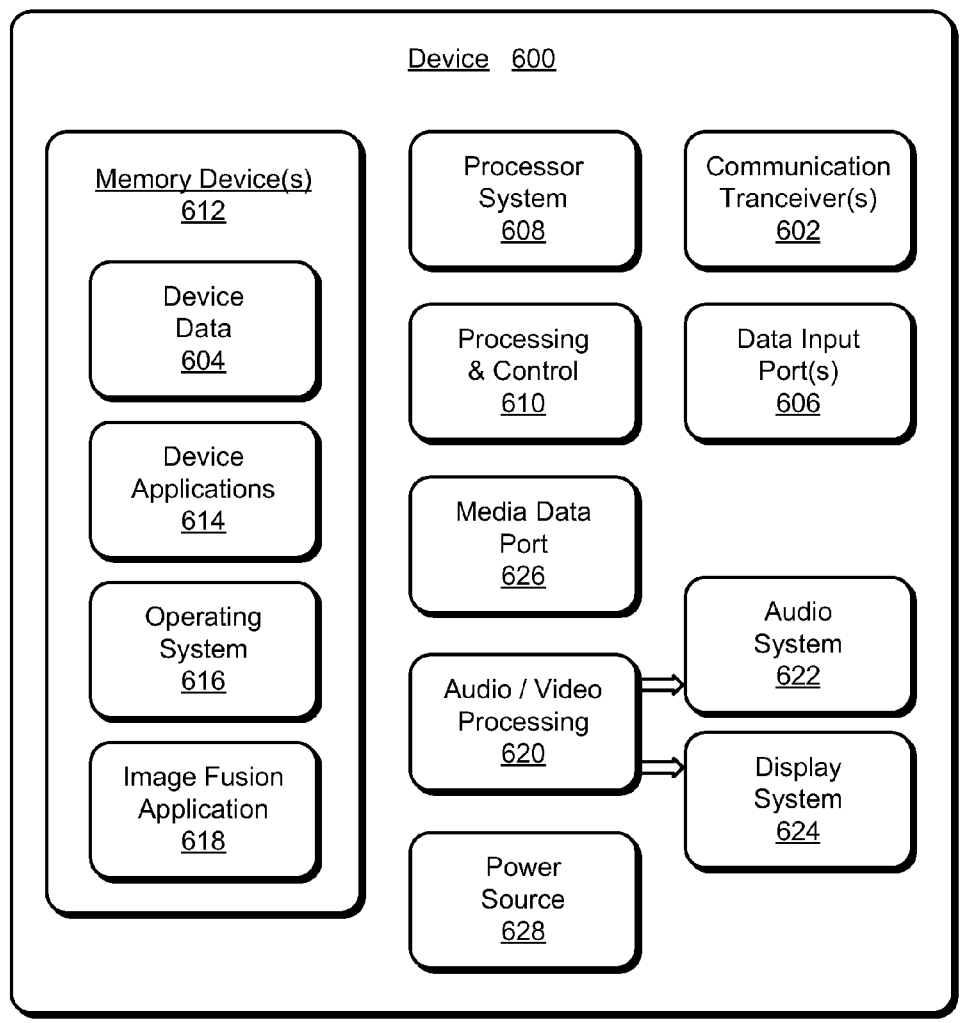
FIG. 6 illustrates various components of an example electronic device that can implement embodiments of a high dynamic range array camera.

FIG. 6 illustrates various components of an example device 600 that can be implemented as any portable device and/or camera device as described with reference to any of the previous FIGS. 1-5. The device 600 includes communication transceivers 602 that enable wired and/or wireless communication of device data 604, such as the captured images. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular telephony, wireless metropolitan area network (WMAN) radios compliant with various IEEE 802.15 (WiMAX™) standards, and wired local area network (LAN) Ethernet transceivers.

The device 600 may also include one or more data input ports 606 via which any type of data, media content, and/or inputs can be received, such as user-selectable inputs, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to components, peripherals, or accessories such as microphones and/or cameras.

The device 600 includes a processor system 608 of one or more processors (e.g., any of microprocessors, controllers, and the like) and/or a processor and memory system (e.g., implemented in an SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 612 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The device 600 may also include a mass storage media device.

A memory device 612 provides data storage mechanisms to store the device data 604, other types of information and/or data, and various device applications 614 (e.g., software applications). For example, an operating system 616 can be maintained as software instructions with a memory device and executed by the processor system 608. The device applications may also include a device manager, such as any form of a control application, software application, signal-processing and control module, code that is native to a particular device, a hardware abstraction layer for a particular device, and so on. The device may also include an image fusion application 618, such as described with reference to FIGS. 1-5.

The device 600 also includes an audio and/or video processing system 620 that generates audio data for an audio system 622 and/or generates display data for a display system 624. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 626. In implementations, the audio system and/or the display system are integrated components of the example device.

The device 600 can also include a power source 628, such as when the device is implemented as a wearable device (e.g., a glasses device). The power source may include a charging and/or power system, and can be implemented as a flexible strip battery, a rechargeable battery, a charged super-capacitor, and/or any other type of active or passive power source.

Although embodiments of a high dynamic range array camera have been described in language specific to features and/or methods, the subject of the appended claims is not necessarily limited to the specific features or methods described. Rather, the specific features and methods are disclosed as example implementations of a high dynamic range array camera.

The invention claimed is:

1. A camera device, comprising:
   one or more HDR monochromatic image sensors configured to capture light of an image as an HDR clear image in monochrome;
   one or more HDR color image sensors configured to capture the light of the image as a Bayer image;
   a processing system to implement image processing algorithms of an image fusion application that is configured to:
   demosaic the Bayer image to generate an initial color image;
   demosaic the HDR clear image to generate a clear image;
   denoise the clear image to generate a denoised clear image;
   apply the denoised clear image as a guide image to generate a filtered color image; and
   fuse the filtered color image and the denoised clear image to produce an enhanced, high-resolution HDR color image based on the initial color image and the clear image.

2. The camera device as recited in claim 1, wherein the one or more HDR monochromatic image sensors include interlaced pixel lines having alternating higher exposure times and lower exposure times.

3. The camera device as recited in claim 2, wherein the interlaced pixel lines of the one or more HDR monochromatic image sensors include odd numbered pixel lines having the higher exposure time and even numbered pixel lines having the lower exposure time.

4. The camera device as recited in claim 1, wherein the one or more HDR monochromatic image sensors include a checkerboard pixel pattern with white pixels of the checkerboard pixel pattern having an exposure duration and black pixels of the checkerboard pixel pattern having a different exposure duration.

5. The camera device as recited in claim 1, wherein the image fusion application is configured to independently interpolate the Bayer image and the HDR clear image to said generate the initial color image and the clear image.

6. The camera device as recited in claim 1, wherein the one or more HDR monochromatic image sensors and the one or more HDR color image sensors are operable together in one of a non-HDR mode or in an HDR mode.

7. The camera device as recited in claim 1, wherein the one or more HDR monochromatic image sensors and the one or more HDR color image sensors are operable as one of:
   the one or more HDR monochromatic image sensors operate in a non-HDR mode and the one or more HDR color image sensors operate in an HDR mode; or
   the one or more HDR monochromatic image sensors operate in the HDR mode and the one or more HDR color image sensors operate in the non-HDR mode.

8. The camera device as recited in claim 1, wherein the image fusion application is further configured to:
   generate a disparity map to establish correspondence between color image pixels of the initial color image and clear image pixels of the clear image;
   generate a mapped color image based on the disparity map to map the initial color image onto the clear image; and
   reiterate to update the disparity map and the mapped color image based on the enhanced, high-resolution HDR color image to map the enhanced, high-resolution HDR color image onto the clear image.

9. A method, comprising:
   capturing light of an image as an HDR clear image in monochrome with one or more HDR monochromatic image sensors;
   capturing the light of the image as a Bayer image with one or more HDR color image sensors;
   demosaicing the Bayer image to generate an initial color image;
   demosaicing the HDR clear image to generate a clear image;
   denoising the clear image to generate a denoised clear image;

applying the denoised clear image as a guide image to generate a filtered color image; and fusing the filtered color image and the denoised clear image to produce an enhanced, high-resolution HDR color image based on the initial color image and the clear image.

10. The method as recited in claim 9, wherein the one or more HDR monochromatic image sensors include interlaced pixel lines having alternating higher exposure times and lower exposure times.

11. The method as recited in claim 10, wherein the interlaced pixel lines of the one or more HDR monochromatic image sensors include odd numbered pixel lines having the higher exposure time and even numbered pixel lines having the lower exposure time.

12. The method as recited in claim 9, wherein the one or more HDR monochromatic image sensors include a checkerboard pixel pattern with white pixels of the checkerboard pixel pattern having an exposure duration and black pixels of the checkerboard pixel pattern having a different exposure duration.

13. The method as recited in claim 9, further comprising:
independently interpolating the Bayer image and the HDR clear image to said generate the initial color image and the clear image.

14. The method as recited in claim 9, wherein the one or more HDR monochromatic image sensors and the one or more HDR color image sensors are operable together in one of a non-HDR mode or in an HDR mode.

15. The method as recited in claim 9, wherein the one or more HDR monochromatic image sensors and the one or more HDR color image sensors are operable as one of:
the one or more HDR monochromatic image sensors operate in a non-HDR mode and the one or more HDR color image sensors operate in an HDR mode; or
the one or more HDR monochromatic image sensors operate in the HDR mode and the one or more HDR color image sensors operate in the non-HDR mode.

16. The method as recited in claim 9, further comprising:
generating a disparity map to establish correspondence between color image pixels of the initial color image and clear image pixels of the clear image;
generating a mapped color image based on the disparity map to map the initial color image onto the clear image; and
reiterating to update the disparity map and the mapped color image based on the enhanced, high-resolution HDR color image to map the enhanced, high-resolution HDR color image onto the clear image.

17. A portable device, comprising:
a camera device configured to capture light of an image as a Bayer image with a color image sensor, and capture the light of the image as an HDR clear image in monochrome with an HDR monochromatic image sensor;
a color demosaicing algorithm configured to generate an initial color image from the Bayer image;
a mono demosaicing algorithm configured to generate a clear image from the HDR clear image; and
an image fusion application configured to:
demosaic the Bayer image to generate the initial color image;
demosaic the HDR clear image to generate the clear image;
denoise the clear image to generate a denoised clear image;
apply the denoised clear image as a guide image to generate a filtered color image; and
fuse the filtered color image and the denoised clear image to produce an enhanced, high-resolution HDR color image based on the initial color image and the clear image.

18. The portable device as recited in claim 17, wherein the HDR monochromatic image sensor includes interlaced pixel lines having alternating higher exposure times and lower exposure times.

19. The portable device as recited in claim 17, wherein the HDR monochromatic image sensor includes a checkerboard pixel pattern with white pixels of the checkerboard pixel pattern having an exposure duration and black pixels of the checkerboard pixel pattern having a different exposure duration.

20. The portable device as recited in claim 17, wherein the HDR monochromatic image sensor and the color image sensor are operable as one of:
together in a non-HDR mode;
together in an HDR mode;
the HDR monochromatic image sensor operates in the non-HDR mode and the color image sensor operates in the HDR mode; or
the HDR monochromatic image sensor operates in the HDR mode and the color image sensor operates in the non-HDR mode.

* * * * *